United States Patent [19]

Acker et al.

[11] Patent Number: 4,758,385
[45] Date of Patent: Jul. 19, 1988

[54] PLATE FOR EVAPORATIVE HEAT EXCHANGER AND EVAPORATIVE HEAT EXCHANGER

[75] Inventors: Robert M. Acker, Englewood; Karl L. Egbert, Arvada, both of Colo.

[73] Assignee: Norsaire Systems, Denver, Colo.

[21] Appl. No.: 65,054

[22] Filed: Jun. 22, 1987

[51] Int. Cl.⁴ ............................................. B01F 3/04
[52] U.S. Cl. ................................. 261/153; 261/154; 261/156; 261/104
[58] Field of Search ............ 261/153, 154, 156, 112.2, 261/104

[56] References Cited

U.S. PATENT DOCUMENTS

| | | | |
|---|---|---|---|
| 3,473,604 | 10/1969 | Tiefenbacher | 165/166 |
| 3,590,917 | 7/1971 | Huber et al. | 165/167 |
| 3,661,203 | 5/1972 | Mesher | 165/167 |
| 3,783,090 | 1/1974 | Andersson et al. | 161/166 |
| 3,954,920 | 5/1976 | Heath | 261/104 |
| 3,995,689 | 12/1976 | Cates | 261/153 |
| 4,002,040 | 1/1977 | Munters et al. | 62/121 |
| 4,099,928 | 7/1978 | Norback | 29/157 |
| 4,299,878 | 11/1981 | Rheaume | 156/148 |
| 4,461,733 | 7/1984 | Otterbein | 261/153 |
| 4,563,314 | 1/1986 | Ernst et al. | 261/153 |
| 4,708,832 | 11/1987 | Norback | 261/153 |

FOREIGN PATENT DOCUMENTS 678100  6/1939  Fed. Rep. of Germany ... 261/112.2
2810094 10/1978  Fed. Rep. of Germany ... 261/112.2

Primary Examiner—Tim Miles
Attorney, Agent, or Firm—Carl Schaukowitch

[57] ABSTRACT

A plate for an evaporative heat exchanger is stamped from a laminate material comprising a thin sheet of light-weight, heat conductive, formable metal such as aluminum superimposed on and attached to a thin sheet of wicking material. Stamping the laminate material simultaneously cuts the plate into a substantially square, pre-determined size, forms a series of ribs and corresponding recesses into the plate and blanks square notches into each corner of the plate to define four edges. The ribs are spaced apart in a substantially parallel manner, appear substantially semicircular in configuration and extend longitudinally and substantially across the plate. A method to fabricate said plate is also described. A plurality of said plates is stacked in a serial relationship and attached along corresponding edges at opposite ends to form alternating air conditioning channels and evaporative cooling channels defined by metal surfaces and wicking material surfaces respectively whereby the conditioned air flows perpendicularly to the secondary air and water.

10 Claims, 15 Drawing Sheets

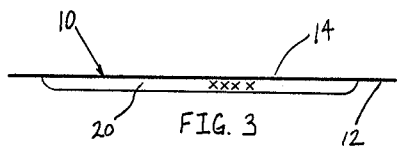
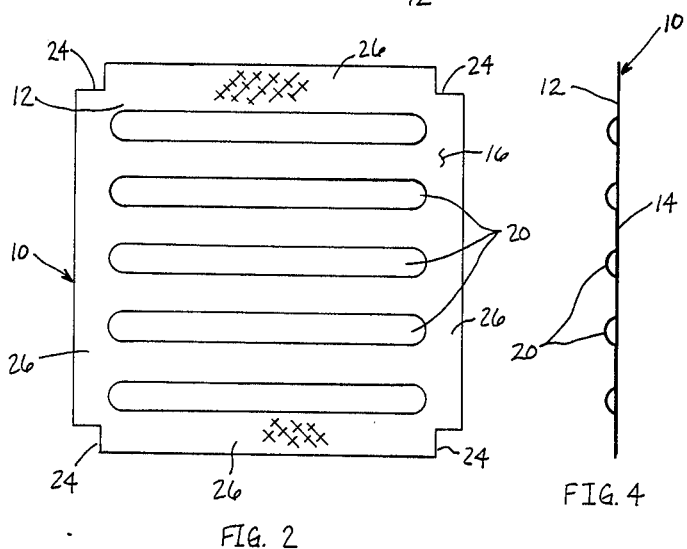
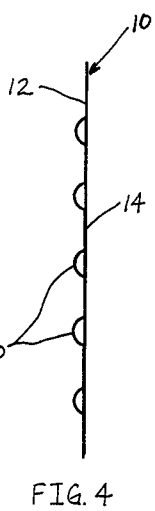
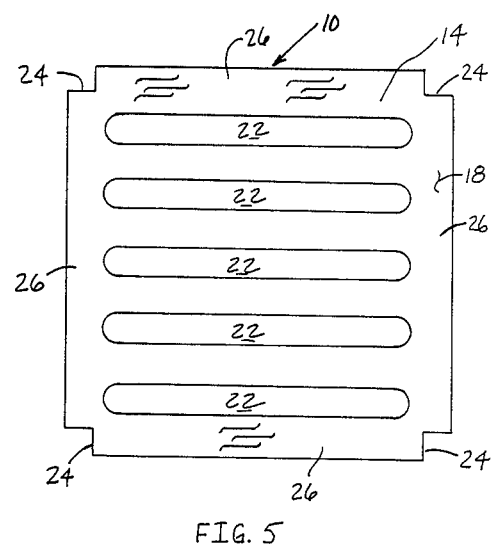

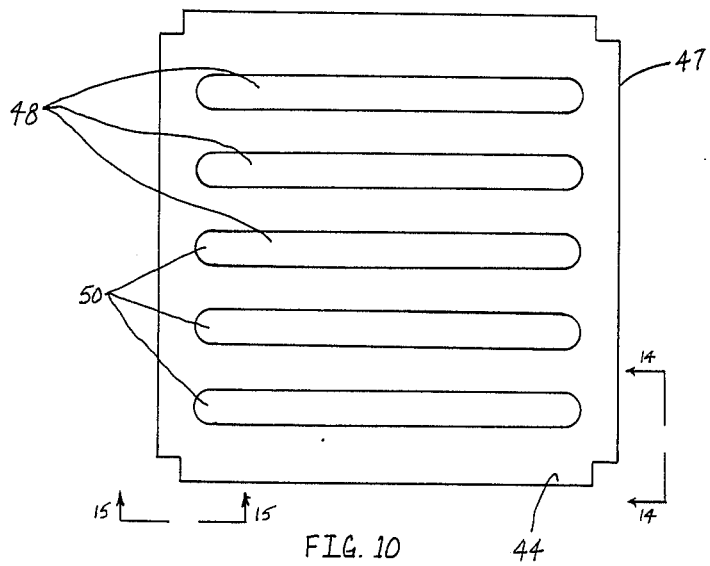
FIG. 10
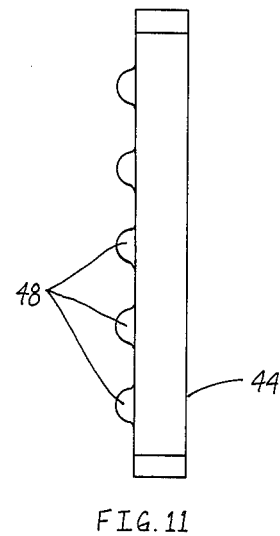
FIG. 11
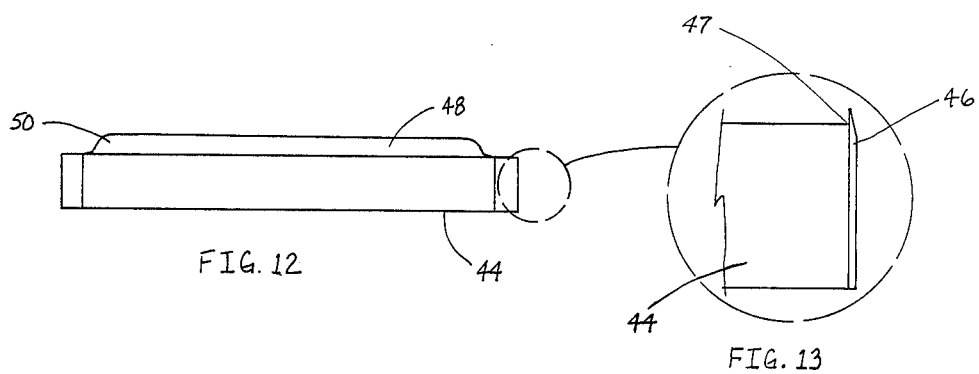
FIG. 12
FIG. 13
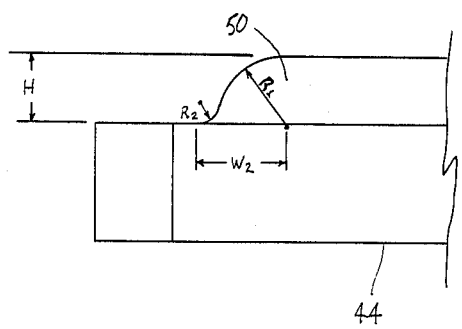
FIG. 15
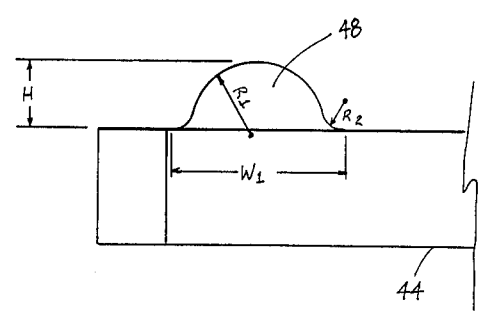
FIG. 14

PLATE FOR EVAPORATIVE HEAT EXCHANGER AND EVAPORATIVE HEAT EXCHANGER

BACKGROUND OF THE INVENTION

This invention relates to a new and improved evaporative heat exchanger for use with evaporative air conditioning units. More particularly, the invention relates to a new and improved plate for fabrication of plate-type evaporative heat exchangers.

In the past, evaporative heat exchangers were fabricated from thick, metal plates. Channels were formed by the placement of spacers between these plates. The thickness of the plates provided rigid support for the plates as high velocity air was blown through the channels during operating conditions. Metal plates were expensive because cost was based upon the weight of the metal. Placement of the spacers betwen the plates resulted in added material cost as well as labor costs for assembly.

When water was sprayed, dripped or injected into the channels where evaporation occurred, water would not adequately cover the surfaces of the plates. Only a portion of the surface of the plates was covered with water. Since effective cooling through evaporation can occur only where water contacts the surface of the plates, cooling of the plates was limited to the wetted surface which, in turn, resulted in poor operating performance.

In certain evaporative heat exchangers, the plates were fabricated from materials such as plastic that exhibited hydrophobic characteristics. Thus, water tended to bead on the surface and, when sufficiently accumulated, the water would flow out of the channels where evaporation occurred. Beading of water indicates resistance of the water to disperse and wet the surface of the plates. Instead of a thin film of water distributed over the entire surface of the plate, beads of water occupied only portions on the surface of the plate. As a result, unwetted portions of the plate cannot contribute to evaporative cooling. Further, the depth of the water bead acts as an insulator, thereby, inhibiting heat transfer.

Large evaporative air conditioning units for small-scale commercial buildings such as schools, light manufacturing facilities and the like must deliver volumes of conditioned air in the range of twenty five thousand cubic feet per minute (25,000 cfm) at a temperature of fifty five degrees Fahrenheit (55° F.). Two major design considerations for large evaporative air conditioning units are the aesthetics of the housing and cost competitiveness with heat pumps and Freon air conditioners.

Architects who design small-scale commercial buidings prefer that large evaporative air conditioning units for rooftop installation have an appearance of a short, box-shaped housings. Any other housing configurations, particularly tall housings, or added components to the box-shaped housing are undesirable because these features detract from the aesthetics of the building.

Shipping a large evaporative air conditioning unit can be expensive if the unit is exceptionally wide. The 1987 regulations promulgated by Interstate Commercial Commission require that trucks carrying a load wider than welve feet (12') must pay extra fees for an over-width permit and must have an escort vehicle accompanying this truck in route.

One manufacturer manufactures an evaporative air conditioning unit having an aluminum plate-type heat exchanger. The plate comprises two thin, flat sheets of aluminum separated by and attached to a corrugated sheet of aluminum to form a series of parallel channels between the corrugations for conditioned air. The outer surfaces of this plate are laminated with a sheet of material capable of being wetted. A series of these plates are attached together by spacers to form channels for evaporative cooling. This heat exchanger operates nominally at 3,600 cubic feet of conditioned air per minute at 55° F. Calculations indicate that approximately seven (7) of these heat exchangers would be required to deliver 25,000 cubic feet per minute at 55° F. Seven (7) juxtaposed heat exchangers of this type would result in a large evaporative air conditioning unit with its housing being approximately fourteen feet (14') wide.

Another manufacturer also manufactures an evaporative air conditioning unit having an aluminum plate-type heat exchanger. Each plate is formed with a set of truncated dimples that protrude from the surface of the plate. These dimples serve a spacing function to separate the plates without spacers and to define channels therebetween when assembled into an evaporative heat exchanger. Furthermore, the truncated dimples interupt the boundary layer of air flowing through the air conditioning channels to enhance the heat transfer capability of the heat exchanger. An epoxy resin coats the aluminum plates within the channels where evaporation occurs to prevent corrosion of such plates. However, this coating is inherently hydrophobic. This heat exchanger operates nominally at 17,000 cubic feet per minute at 55° F. To achieve performance of 25,000 cubic feet of conditioned air per miute at 55° F., the housing for this evaporative air conditioning unit incorporating such a heat exchanger would be approximately thirteen and a half feet (13.5') wide.

It is from these considerations and others that the present invention evolved.

SUMMARY OF THE INVENTION

The present invention provides significant improvements and advantages over prior art plates for evaporative heat exchangers, particularly with respect to inherent characteristics of the plate to distribute and disperse water into a thin film across the surfaces where evaporation and heat transfer occur, to transfer heat through a light-weight, thin, heat-conductive, formable sheet material, to interrupt the boundary layer of both the conditioned air and secondary air for enhanced heat transfer and to provide uniform spacing between the plates without additional spacers or other hardware. A plurality of such plates is assembled into a new and improved evaporative heat exchanger capable of delivering 25,000 cfm at 55° F. which is compact compared to the prior art evaportive heat exchangers currently in the marketplace.

Generally summarized, the new and improved plate for evaporative heat exchangers comprises a thin, substantially square sheet of thin, light-weight, heat-conductive metal such as aluminum laminated to a thin, substantially square sheet of wicking material to form a composite plate having a metal surface and an opposite wicking material surface. Stamped into the composite plate by a standard punch and die, a series of parallel, longitudinally-extending ribs protrude from one surface and corresponding recesses sink into the other opposite surface of the composite plate. Such ribs are spaced apart in a substantially parallel manner, appear substantially semicircular in configuration and extend substantially across the composite plate. A positive composite plate is formed if the ribs protrude from the metal surface and the corresponding recesses sink into the wicking material surface; a negative composite plate is formed if the ribs protrude from the wicking material surface and the corresponding recesses sink into the metal surface.

An evaporative heat exchanger comprises a plurality of positive and negative composite plates attached together in a serial relationship. The positive and negative composite plates interface each other at the wicking material surfaces and in a manner such that the longitudinal direction of the recesses of the positve composite plate is perpendicular to the longitudinal direction of the ribs of the negative composite plate. Such plates are attached to each other along corresponding edges at two opposite ends of each composite plate to define an evaporative cooling channel herebetween. A second positive composite plate interfaces the negative composite plate at the metal surfaces and in a manner such that the longitudinal direction of the ribs of the positive composite plate is positioned perpendicular to the longitudinal direction of the ribs of the negative composite plate. Such plates are attached to each other along corresponding edges at two opposite ends of each composite plate to define an air conditioning channel.

The present invention is described and shown in greater specificity in drawings and the following description of the preferred embodiment. Comprehension of the various aspects of the invention should lead to an increased appreciation for the significance of the invention and its advancement over the prior art.

BRIEF DESCRIPTION OF THE DRAWINGS

Other objects, advantages and capabilities of the present invention will become more apparent as the description proceeds, taken in conjunction with the accompanying drawings in which:

FIG. 2 is a front elevational view of the plate shown in FIG. 1.

FIG. 3 is a top planar view of the plate shown in FIG. 1.

FIG. 4 is a side elevational view of the plate shown in FIG. 1.

FIG. 5 is a back elevational view of the plate shown in FIG. 1.

FIG. 10 is a top planar view of a punch of the tool shown in FIG. 9.

FIG. 11 is a side elevational view of the punch of the tool shown in FIG. 9.

FIG. 12 is a front elevational view of the punch of the tool shown in FIG. 9.

FIG. 13 is an enlarged view of a portion of a peripheral edge of the punch shown in FIG. 10, illustrating a standard rule die.

FIG. 14 is an enlarged side elevational view taken substantially in the plane 14—14 of FIG. 10, illustrating the dimensions of the forming portions of the punch.

FIG. 15 is an enlarged side elevational view taken substantially in the plane 15—15 of FIG. 10, illustrating the dimensions of the ends of the forming portions of the punch.

DESCRIPTION OF THE PREFERRED EMBODIMENT

Figure 1:
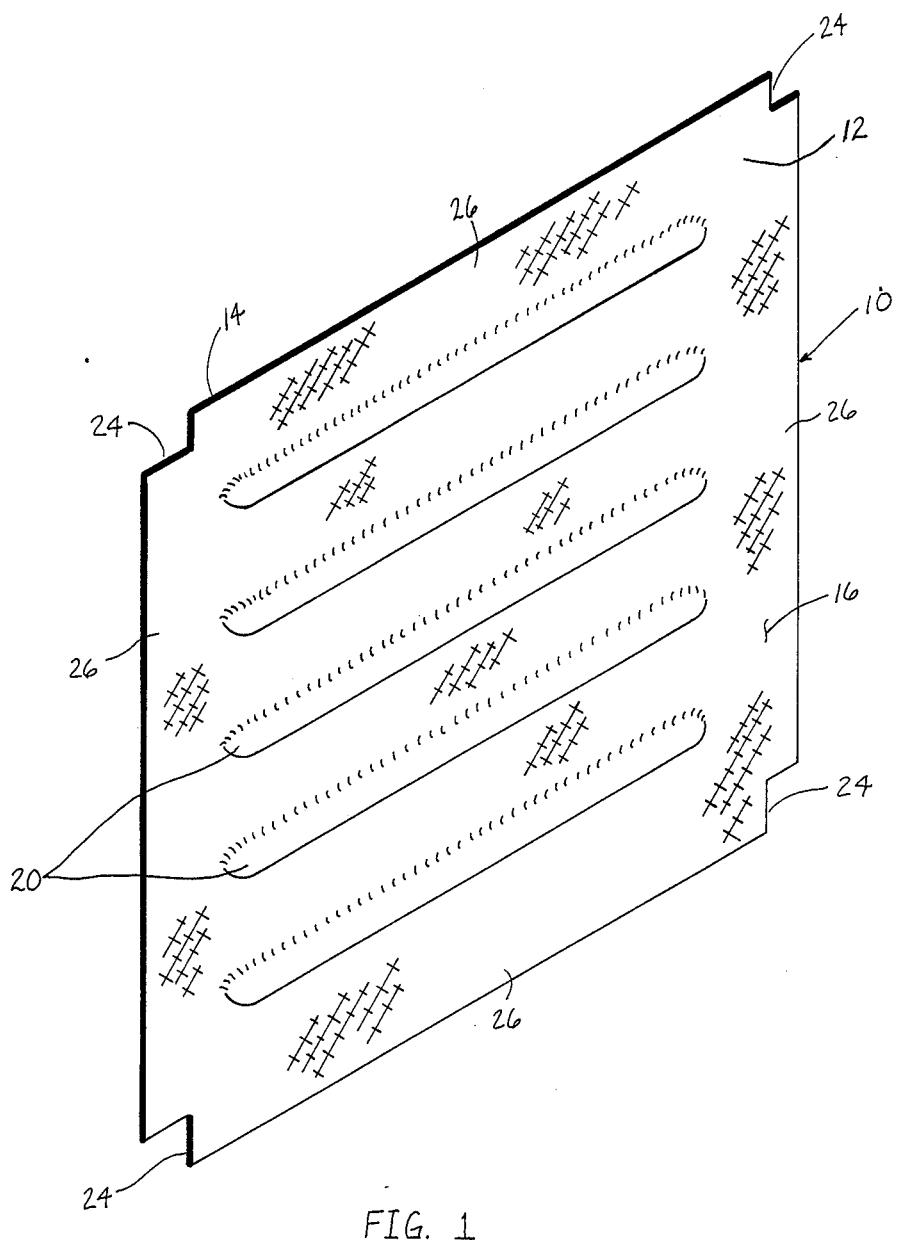
FIG. 1 is a perspective view of the new and improved plate for evaporative heat exchangers.

The present invention is generally introduced by a composite plate 10 shown by FIGS. 1, 2, 3, 4 and 5. A substantially square sheet of metal 12 is laminated to a substantially square sheet of wicking material 14. A series of parallel ribs 20 protrude from a metal surface 16 of the composite plate 10 and corresponding recesses 22 sink into a wicking surface 18 of the composite plate 10. A stamping process simultaneously forms the ribs 20 and the corresponding recesses 22 into the composite plate 10, blanks square notches 24 into each corner of the composite plate 10 to define edges 26 and cuts the composite plate 10 to size and into a substantially square configuration.

The composite plate 10 is fabricated from the sheet of metal 12 which is then laminated to the sheet of wicking material 12. For the preferred embodiment, aluminum was selected as the sheet of metal 12 because of its inherent characteristics as thin, light-weight, heat-conductive and formable. The sheet of wicking material 14 is chosen for the preferred embodiment is primarily a paper product having a fiberglass base which exhibits qualities to absorb water and to distribute and disperse it throughout the wicking surface 18.

Figure 6:
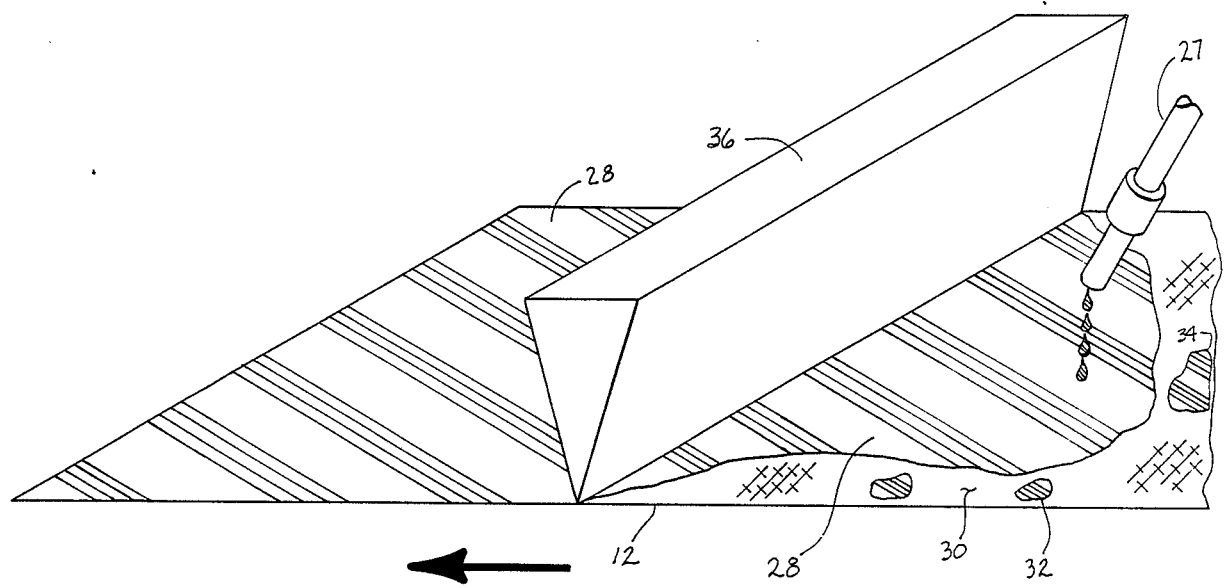
FIG. 6 is schematic view of a process to apply a liquid adhesive for fabrication of the plate shown in FIG. 1.

As best shown by FIG. 6, the sheet of metal 12 moves in a direction shown by the arrow and underneath a nozzle 27 attached to a source (not shown) of liquid adhesive 28. The nozzle 27 drips or sprays the liquid adhesive 28 onto the exposed metal surface 30 as the sheet of metal 12 passes thereunder. Drops 32 and pools 34 of liquid adhesive 28 accumulate on the exposed metal surface 30 of the sheet of metal 12. The sheet of metal 12 with the applied drops 32 and/or pools 34 of liquid adhesive 28 then passes underneath a blade 36 that simultaneously spreads the liquid adhesive 28 substantially evenly over the entire exposed metal surface 30 and removes excessive liquid adhesive 28 from the exposed metal surface 30.

Figure 7:
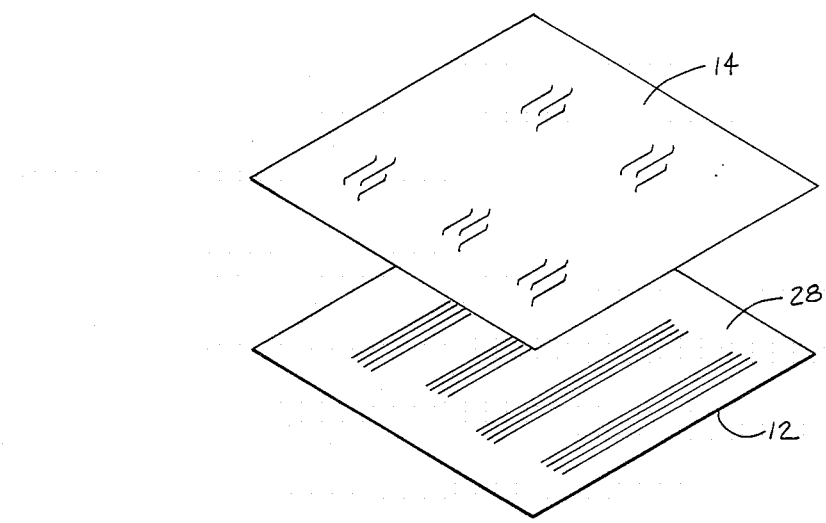
FIG. 7 is an exploded perspective view illustrating major components of the plate shown in FIG. 1.
Figure 8:
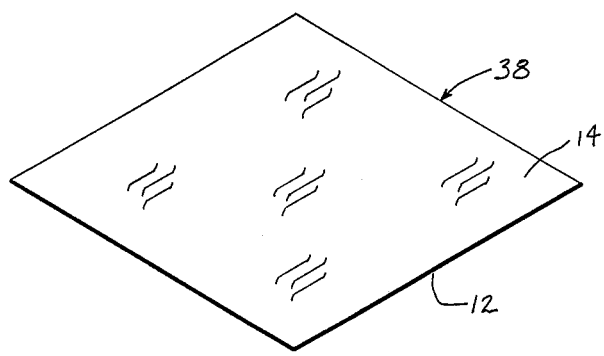
FIG. 8 is a perspective view of a laminated sheet material required for fabrication of the plate shown in FIG. 1.

As shown by FIG. 7, the sheet of wicking material 14 is positioned over the sheet of metal 12 having a substantially even application of uncured liquid adhesive 28. The sheet of wicking material 14 is then superimposed onto the sheet of metal 12, as best shown by FIG. 8. Upon curing of the liquid adhesive 28, a bond is formed between the sheet of metal 12 and the sheet of wicking material 14, resulting in a laminated sheet material 38.

Figure 9:
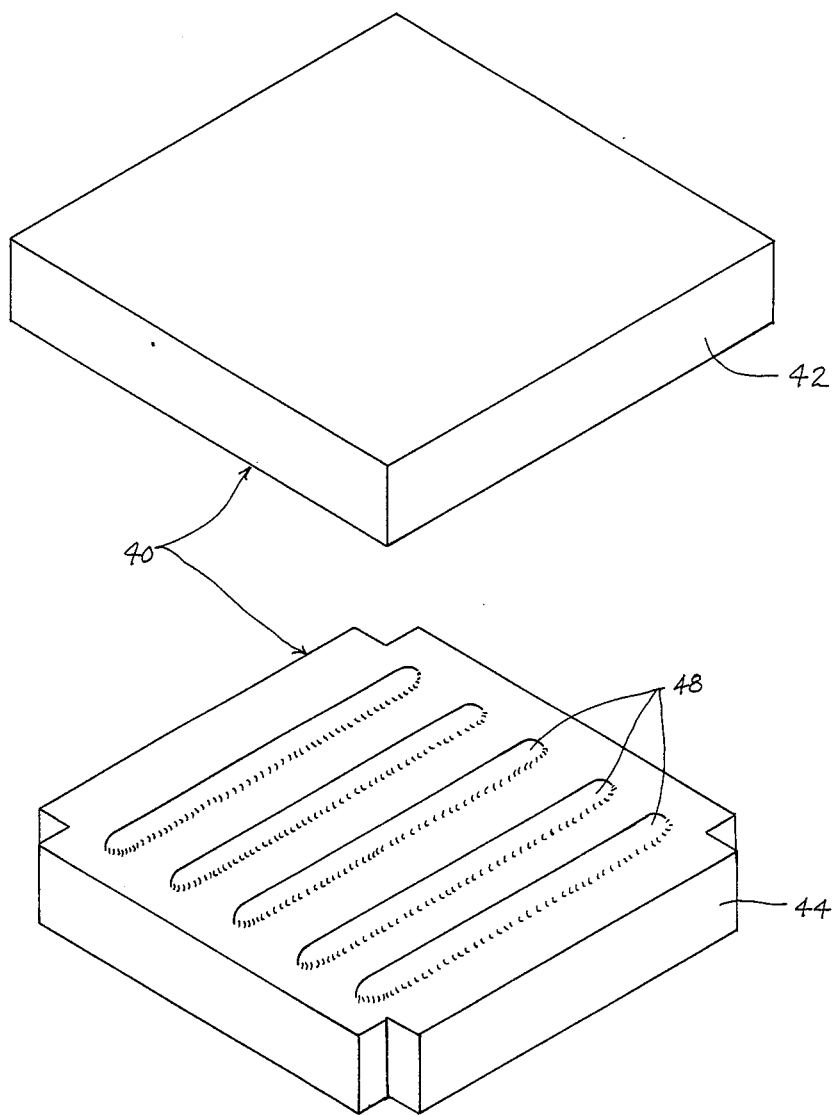
FIG. 9 is a perspective view of a tool utilized to stamp, i.e. form, notch and blank, the laminated sheet material in FIG. 8 to produce the plate shown in FIG. 1.

After the laminated sheet material 38 is fabricated, it is stamped in a typical industry tool 40 as shown by FIG. 9 in which a standard die 42 is positioned above a standard punch 44. Details of the punch 44 are shown by FIGS. 10, 11, 12, 13, 14 and 15. Shown only by FIG. 13, a standard rule die 46 is attached to and along the entire peripheral edge 47 of the punch 44 to cut the laminated sheet material 38 to a substantially square, pre-determined size and to blank the notches 24 into each corner of the composite plate 10. As shown by FIGS. 10, 11 and 12, forming portions 48 of the punch 44 are designed in a manner to correspond to the number and parallel positioning of the ribs 20 extending substantially across the composite plate 10. The forming portions 48 of the punch 44 are shaped in a manner to form the desired configuration of the ribs 20, as shown in FIGS. 1, 2, 3 and 4. As best shown by FIG. 14, dimensions of the forming portions 48 of the punch 44 taken in the plane 14—14 in FIG. 10 are described by a first radius $R_1$, a second radius $R_2$, a height H, and a width $W_1$. FIGS. 10, 12 and 15 show ends 50 of the forming portions 48 of the punch 44. As best shown by FIG. 15 which is taken substantially in the plane 15—15 in FIG. 10, the dimensions of the ends 50 of the forming portions 48 are described by the radius $R_1$, the radius $R_2$, the height H and a width $W_2$. Although experimentation indicated that other rib configurations and dimensions were possible without tearing the sheet of wicking material 14, fracturing the sheet of metal 12 or damaging the bond therebeween, the dimensions of the forming portions of the die for the preferred embodiment of the present invention are as follows:

$R_1 = 0.250$ inches
$R_2 = 0.125$ inches
$H = 0.235$ inches
$W_1 = 0.876$ inches
$W_2 = 0.438$ inches Because stamping the laminated sheet material 38 into the composite plate 10, i.e. forming the ribs 20 and the corresponding recesses 22, blanking the square notches 24 and cutting the laminated sheet material 38 to a substantially square pre-determined size, as best shown in FIGS. 2 and 5, is achieved under typical industry standards and procedures, details of the stamping process will not be described.

Before production of the composite plate 10, experimentation was required to design the rib configuration (described above) and to select the optimum materials. After experimenting with numrous sheet metals as the sheet of metal 12, it was discovered that 1100-0 fin stock aluminum having a thickness of at least 0.003 inches was capable of being stamped into the composite plate 10 with the ribs 20 and corresponding recesses 22 without fracturing the sheet of metal 12. The sheet of wicking material 14 was required to stretch without tearing during the stamping process. The liquid adhesives 28, a standard olefin adhesive, was required to remain sufficiently pliable after it had cured. When stamping the laminated sheet material 38 into the composite plate 10, the cured, liquid adhesive 28 stretched and retained its bond between the sheet of metal 12 and the sheet of wicking material 14. Bonding with this liquid adhesive 28 not only retains the lamination between the sheet of aluminum metal 12 and the sheet of wicking material 14 but also prevents water in the evaporative cooling channel from directly contacting the sheet of aluminum metal 12, and, thus, preventing corrosion of the same. The specified radii, $R_1$ and $R_2$, height, H, widths, $W_1$ and $W_2$, were selected to optimize stress relief on the laminated sheet material 38 during the stamping process, thus avoiding fracturing the sheet of aluminum metal 12, tearing of the sheet of wicking material 14 and/or damaging the integrity of the bond therebetween.

Figure 16:
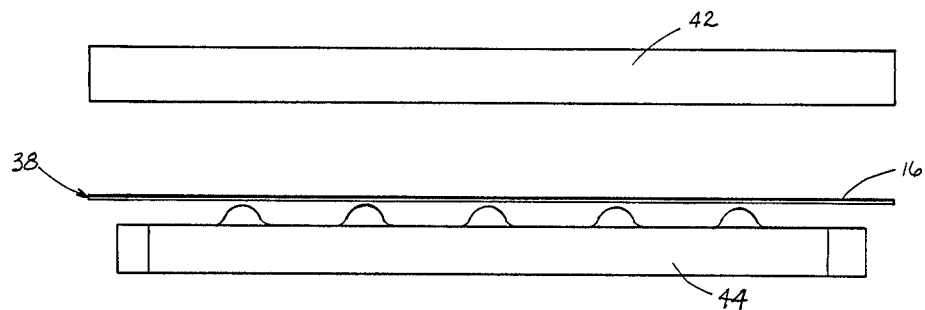
FIG. 16 is a side elevational view of the laminated sheet material shown in FIG. 8 and the tool shown in FIG. 9, illustrating the laminated sheet material, immediately before stamping, positioned with its metal surface facing the die.

As shown by FIG. 16, the laminated sheet material 38 is stamped between the die 42 and the punch 44 with its metal surface 16 facing toward the die 42. Stamping the laminated sheet material 38 in this manner produces a substantially square composite plate 10, as shown in FIG. 1, whereby the ribs 20 protrude from the metal surface 16 and the corresponding recesses 22 (shown in FIG. 5) sink into the wicking surface 18. This type of composite plate 10 will be hereinafter referred to as a 'positive' composite plate 10.

Figure 17:
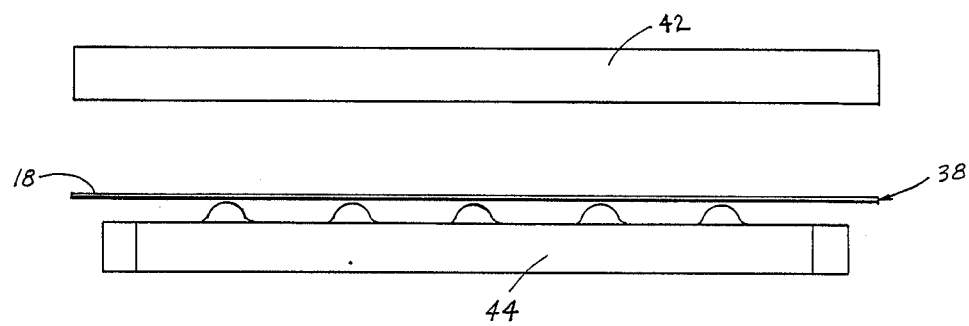
FIG. 17 is a side elevational view of the laminated sheet material shown in FIG. 8 and the tool shown in FIG. 9, illustrating the laminated sheet material, immediately before stamping, positioned with its wicking material surface facing the die.
Figure 18:
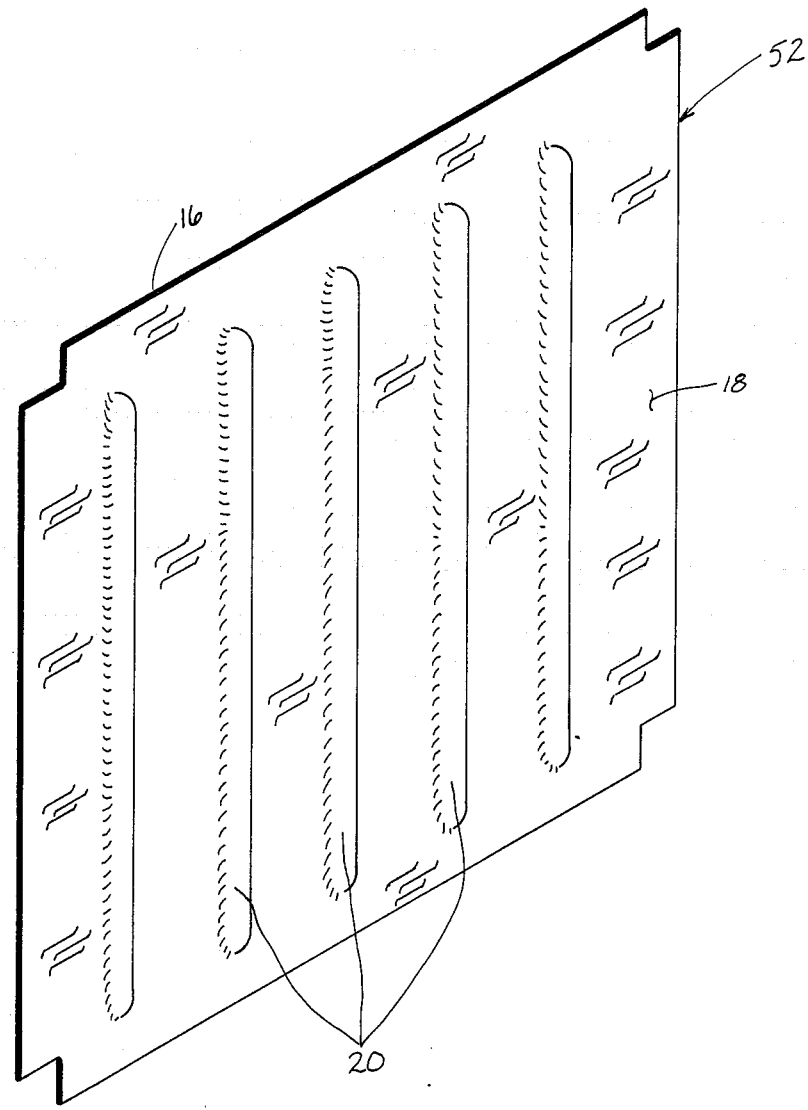
FIG. 18 is a perspective view of a plate after being stamped in a manner shown by FIG. 17.

As shown by FIG. 17, the laminated sheet material 38 is stamped between the die 42 and the punch 44 with its wicking surface 18 facing toward the die 42. Stamping the laminated sheet material 38 in this manner produces a substantially square composite plate 52 as shown in FIG. 18 which reveals that the ribs 20 protrude from the wicking surface 18 and the corresponding recesses 22 (not shown) sink into the metal surface 16. This type of composite plate 52 will be hereinafter referred to as a 'negative' composite plate 52. Thus, the only difference between the positive composite plate 10 and the negative composite plate 52 is whether the laminated sheet material 38 is stamped with its wicking surface 18 facing the die 42 or with its metal surface 16 facing the die 42. In other words, the positive composite plate 10 has ribs protruding from the metal surface 16 and corresponding recesses 22 sinking into the wicking material surface 18;

the negative composite plate 52 has ribs 20 protruding from the wicking material surface 18 and corresponding recesses 22 sinking into the metal surface 16.

Figure 19:
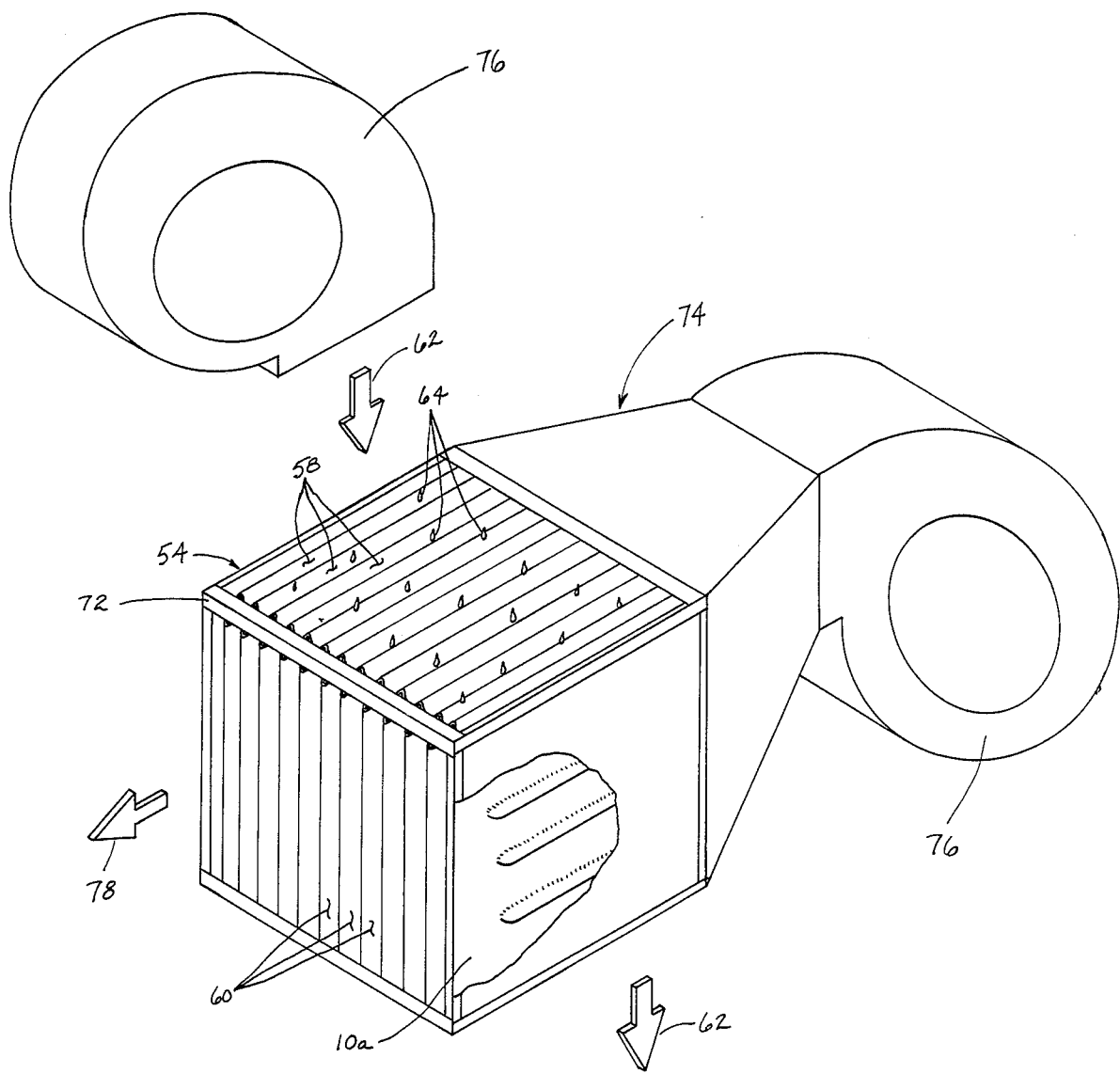
FIG. 19 is a perspective view of a fully-assembled, plate-type heat exchanger installed in a schematic evaporative air conditioning unit and comprised of a plurality of plates shown in FIGS. 1 and 18.

To fabricate an evaporative heat exchanger 54 as shown in FIG. 19, a specific arrangement of positive and negative composite plates is required. An assembly of four (4) composite plates is described in detail hereinbelow only as an example to simplify the description of the preferred embodiment of the present invention. Any number of such plates can be stacked in the alternating arrangement as described below to fabricate an evaporative heat exchanger of the present invention without departing from the spirit thereof.

Figure 20:
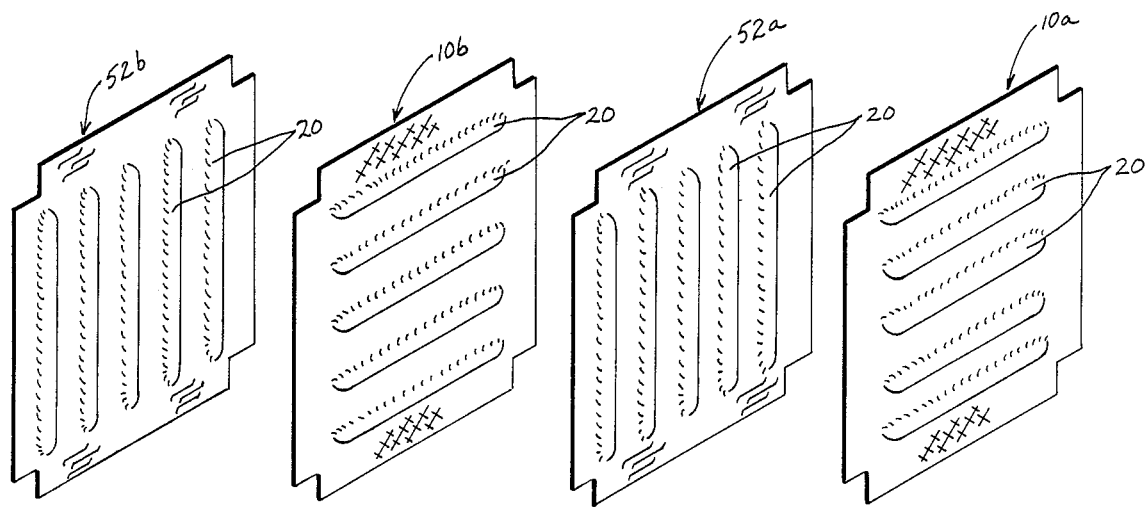
FIG. 20 is an exploded perspective view of plates shown in FIGS. 1 and 18, illustrating the stacking of four plates immediately before assembly.

As best illustrated by FIG. 20, a first positive composite plate 10a, a first negative composite plate 52a, a second positive composite plate 10b, and a second negative composite plate 52b are disposed in an alternating arrangement. Note that the ribs 20 on all four composite plates, 10a, 52a, 10b and 52b, protrude from their respective surfaces in the same direction. However, the ribs 20 extending longitudinally across the positive composite plates 10a and 10b are oriented perpendicularly to the the ribs 20 extending longitudinally across the negative composite plates 52a and 52b.

Figure 21:
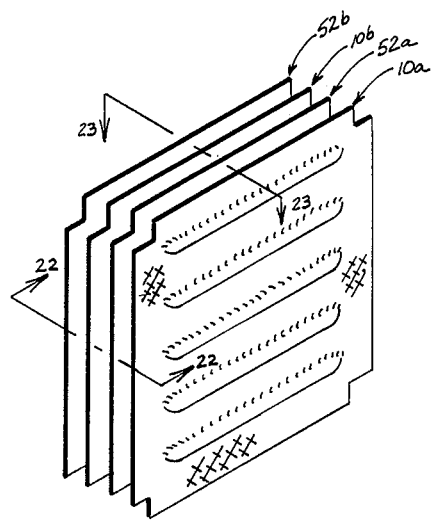
FIG. 21 is a perspective view of plates shown in FIG. 20, illustrating stacking and spacing of the four plates.
Figure 22:
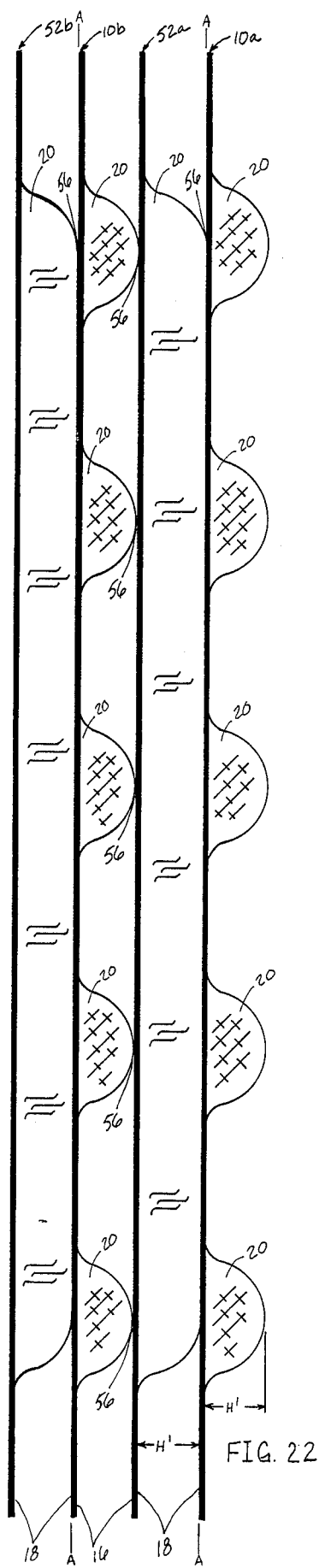
FIG. 22 is a side elevational view taken substantially along plane 22—22 in FIG. 21, illustrating the spacing relationship of the plates.
Figure 23:
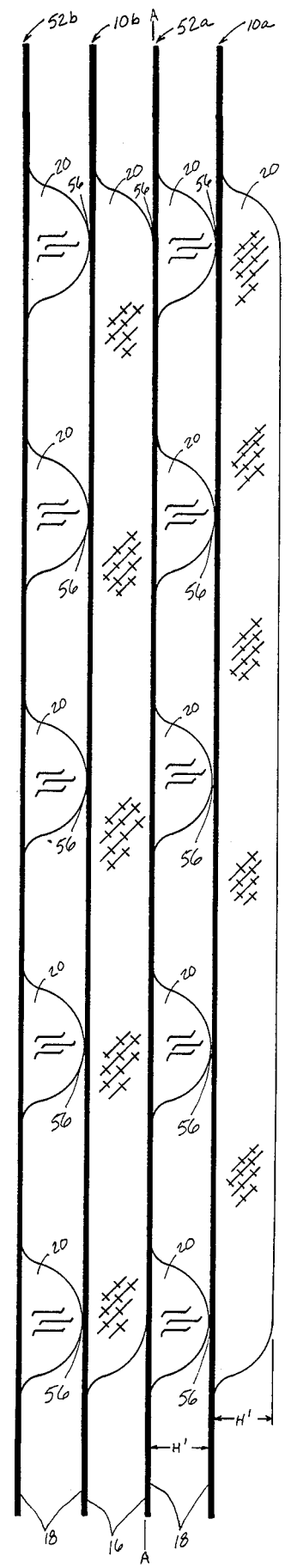
FIG. 23 is a top planar view taken substantially along plane 23—23 in FIG. 21, illustrating the spacing relationship of the plates.
Figure 24:
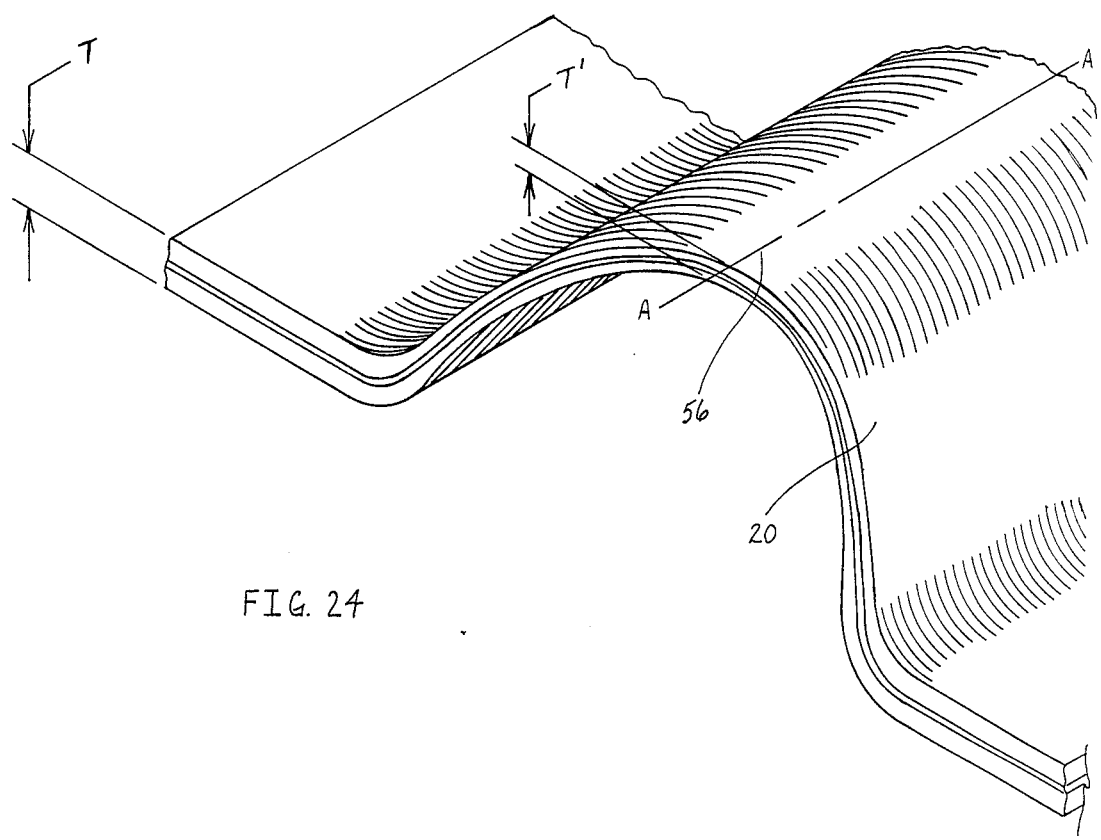
FIG. 24 is an enlarged perspective view of a portion of the plate shown in either FIG. 1 or FIG. 18, illustrating the thickness of a rib after forming.

Assembly of the evaportive heat exchanger 54 shown in FIG. 19 begins by stacking this alternate arrangement of positive and negative composite plates 10a, 52a, 10b and 52b so that sequential contact among the plates occurs in a manner shown in FIG. 21. As best shown by FIGS. 22 and 23, the wicking surfaces 18 of the negative composite plate 52a and 52b contact the wicking surfaces 18 of the positive composite plates 10a and 10b respectively at a crest 56. Likewise, the ribs 20 of the second positive composite plate 10b contact the metal surface 16 of the first negative composite plate 52a at the crest 56 as shown in FIGS. 22 and 23. Such contact at the crest 56 is substantially linear as indicated by lines A—A shown by FIGS. 22, 23 and 24. However, between any two composite plates, such linear contact discontinues (not shown) where the crest 56 of the ribs 20 extends across the recesses 22. FIG. 24 illustrates, in part, where such linear contact is made along the crest 56 of the ribs 20 as represented by line A—A.

This alternate stacking arrangement of the composite plates 10a, 52a, 10b and 52b provides uniform spacing between the composite plates. Spacing between the plates is equivalent to a height H' of the ribs 20 shown in FIGS. 22 and 23.

Figures 25, 28:
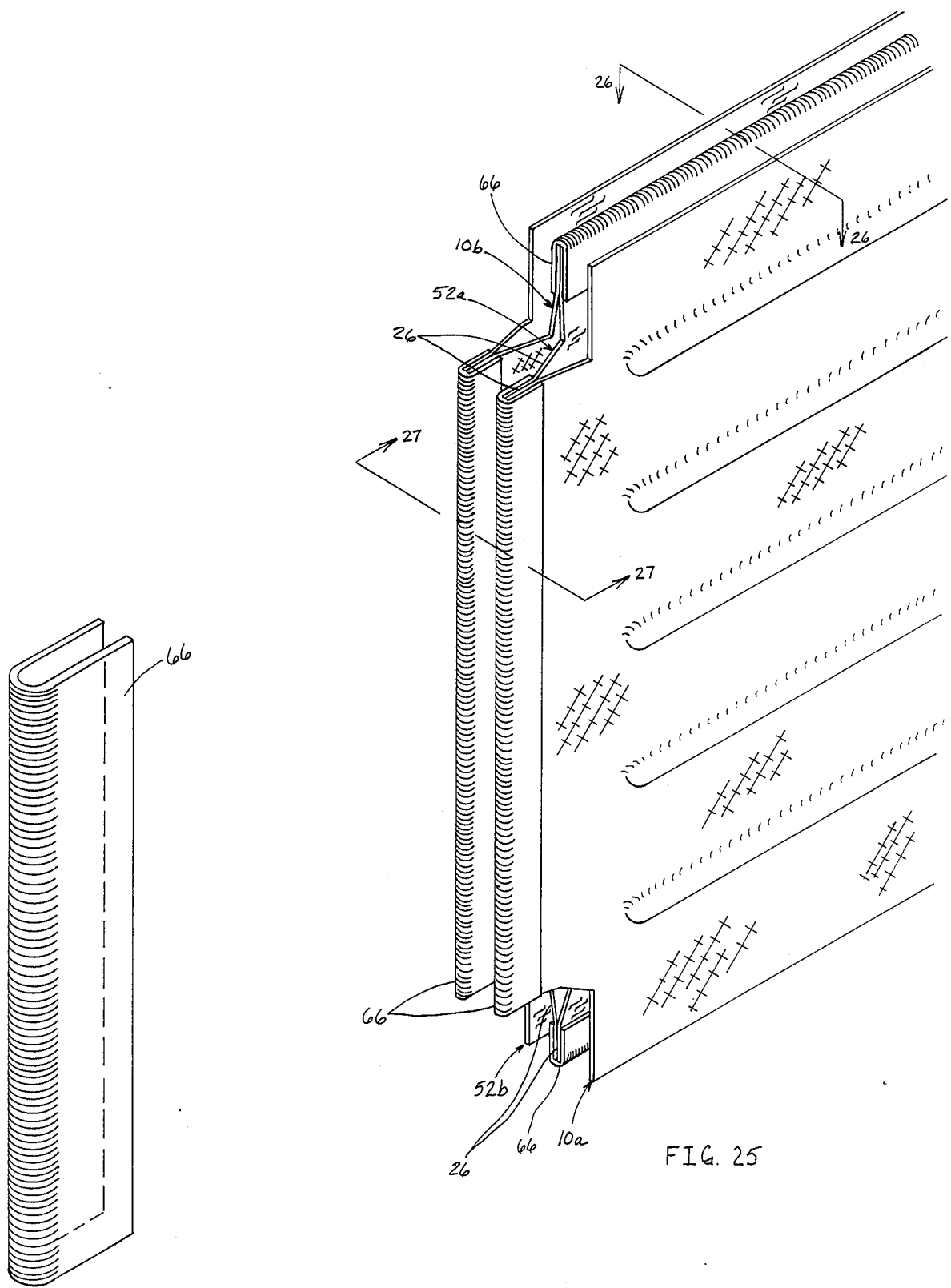
FIG. 25 is a perspective view of the plates shown in FIG. 21, illustrating attachment of the plates.
FIG. 28 is a perspective view of a clamp shown in FIG. 25.
Figure 27:
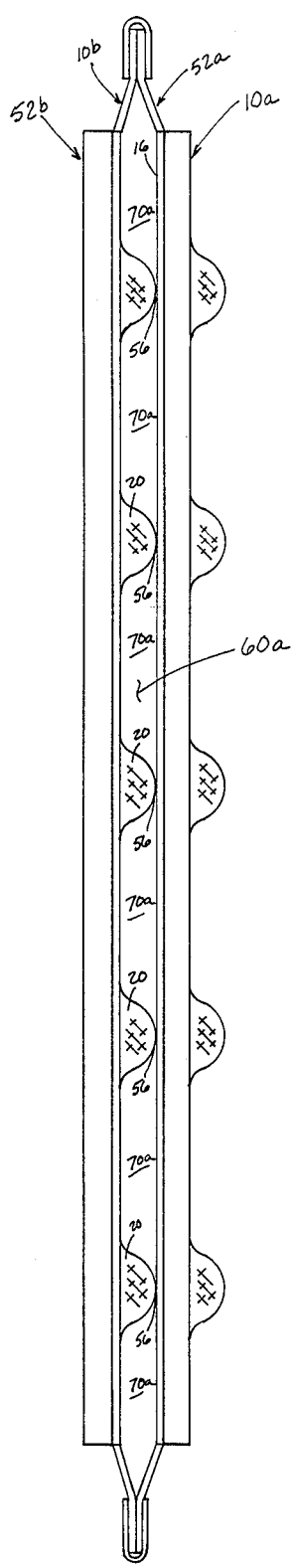
FIG. 27 is a side elevational view taken along lines 27—27 in FIG. 25.
Figure 26:
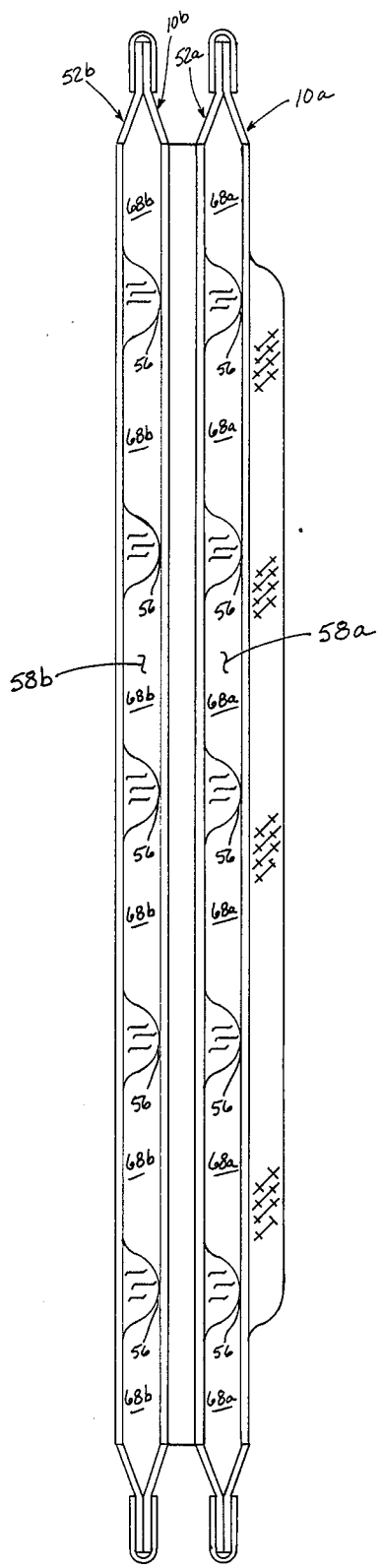
FIG. 26 is a top planar view taken along lines 26—26 in FIG. 25.

After stacking the composite plates 10a, 52a 10b and 52b in this manner, the correponding edges 26 of the composite plates 10 and 52, shown respectively in FIGS. 1 and 18, are attached to each other in a specified alternating arrangement for assembly of the evaporative heat exchanger 54 shown in FIG. 19. As shown by FIG. 25, the first positive composite plate 10a is attached to the first negative composite plate 52a along corresponding edges 26 and at opposite sides (not shown) to form a first evaporative cooling channel 58a as best shown in FIG. 26. Thereafter, the second positive composite plate 10b is attached to the first negative composite plate 52a along corresponding edges 26 and at opposite sides to form a first air conditioning channel 60a as best shown in FIG. 27. Thereafter, the second negative composite plate 52b is attached to the second positive composite plate 10b to form a second evaporative cooling channel 58b and so on until a sufficient number of composite plates are attached in the alternating arrangement to satisfy fabrication requirements. Thus, this redundant assembly procedure results in alternating evaporative cooling channels (58a and 58b) and air conditioning channels (60a) through which air to be conditioned (not shown) flows in a direction perpendicular to the flow of secondary air 62 and drops of water 64 through the evaporative cooling channels 58 shown in FIG. 19.

As shown by FIG. 25, the first positive composite plate 10a is attached to the first negative composite plate 52a along corresponding edges 26. The edges 26 are first glued to each other. Then, a U-shaped clamp 66 as shown in FIGS. 25 and 28 is crimped substantially along the glued edges 26 to add rigidity to the evaporative heat exchanger 54 as well as to maintain the bond between the glued edges 26. All edges 26 requiring attachment to form either evaporative cooling channels 58 or air conditioning channels 60 are attached in an identical manner as described.

Shown by FIG. 26, each of the two evaporative cooling channels 58a and 58b has been divided into six (6) evaporative cooling subchannels 68a and 68b respectively. Attaching the first positive composite plate 10a to the first negative composite plate 52a divides the first evaporative cooling channel 58a into these six (6) evaporative cooling subchannels 68 because of the substantially linear contact along the crest 56 of the ribs 20 therebetween. Likewise, the same occurs for the second evaporative cooling channel 58b as a result of the substantially linear contact between the second positive composite plate 10b and the second negative composite plate 52b.

As shown by FIG. 27, attaching the second positive composite plate 10b to the first negative composite plate 52a divides the air conditioning channel 60a into six (6) air conditioning subchannels 70a because of the substantially linear contact along the crest 56 of the ribs 20 of the second positive compositive plate 10b against the metal surface 16 of the first negative composite plate 52a.

It follows that an evaporative heat exchanger assembled from composite plates with five (5) ribs will produce air conditioning channels and evaporative cooling channels divided into six (6) subchannels. Five (5) ribs were selected for the preferred embodiment for clarity and simplicity of description. A composite plate may contain one or more ribs without departing from the spirit of this invention. Therefore, composite plates having "x" number of ribs will be assembled into an evaporative heat exchanger having evaporative cooling channels and air conditioning channels divided into "x+1" subchannels.

The fully-assembled evaporative heat exchanger 54 shown in FIG. 19 is assembled from a plurality of positive and negative composite plates. The fully-assembled evaporative heat exchanger 54 helded in place by a frame 72 is installed into the standard evaportive air conditioning unit 74 designed for cross-flow operations. This evaportive air conditioning unit 74 is a typical cross-flow evaporative air conditioning unit but performs more effectively than prior art evaporative air conditioning units because of the inherent advantages of the present invnetion.

In brief, the evaporative air conditioning unit 74 operates with a first blower 76 blowing conditioned air 78 through the air conditioning channels 60 for cooling. Simultaneously therewith, drops of water 64 drip and secondary air 62 blows into the evaporative cooling channels 58.

During experimentation, it was observed that the drops of water 64 were absorbed into the wicking material surface 18 and distributed and dispersed throughout the sheets of wicking material 14 with a tendency to form a thin layer of water (not shown) throughout the wicking surface (not shown). Such results are desirable primarily for two reasons. One, this thin film of water covers substantially the entire wicking surfaces 18 and, therefore, a more wetted surface contributes to evaporation and, consequently, cooling. It is believed that capillary action, an inherent characteristic of the sheets of wicking material 14, provides distribution and dispersion of the water 80 into such film. Two, textbook theory indicates that heat transfer is greater through a thinner heat conductor, i.e. a film of water dispersed through the wicking material, than a thicker heat conductor, i.e. beads of water, of the identical material. Thus, cooling is enhanced.

The design of the positive composite plate 10 itself contributes to the distribution of water 80 within the evaportive cooling channel 62. The longitudinal direction of the recesses (not shown) on the positive composite plate 10 is perpendicular to the direction of the dripping water 64 and the flow of secondary air 62. During an experiment, it was observed that when the water 64 was absorbed into the sheets of wicking material 14 on the positive composite plate 10, the water 64, as it began to flow out of the recesses (not shown), simultaneously flowed laterally in the longitudinal direction of the recesses. Thus, the recesses sinking into the wicking surfaces tend to distribute water laterally within the evaporative cooling channels for better distribution of the water 64.

It is worthy to briefly desribe the heat transfer theory for cross-flow evaporative air conditioning units. Unconditioned air is blown from the blower through the air conditioning channels at the same time the water in the evaporative cooling channels is being evaporated. Heat on the metal surfaces defining the air conditioning channels transfers from the metal surface, through the metal, through the adhesive layer and into the wicking material and thin film of water dispersed therewithin. Such heat assists in the evaporation of the water, the essence of the cooling effect which occurs on the wicking material surface. The metal surface cools as a result of this heat transfer. The conditioned air blowing across the air channels exchanges any heat contained in it with the cooling metal surface. Thus, by the time that the conditioned air from the blower exits the air conditioning channels of the evaporative heat exchanger, the air temperature of the conditioned air has dropped to a lower temperature.

The present invention has enhanced heat transfer qualities due to the recesses in the air conditioning channels and evaporative cooling channels that extend perpendicular to the direction of the flow of the conditioned air and the secondary air and drops of water respectively. It is well known that in small hydraulic diameter heat exchangers, higher performance characteristics can be obtained by modification of the surface geometry. The objective of this modification is to increase the convection conductance for a given flow of air. Most commonly, this is achieved by changing the surface geometry of the air conditioning and evaporative cooling channels so that the boundary layer of the flowing air cannot grow thick. For the present invention, forming recesses into the composite plates constitutes the change in surface geometry. Although forming recesses slightly increases friction and, thus, requires additional power to drive the blower, the increased conductance offsets this additional power requirement.

Figure 29:
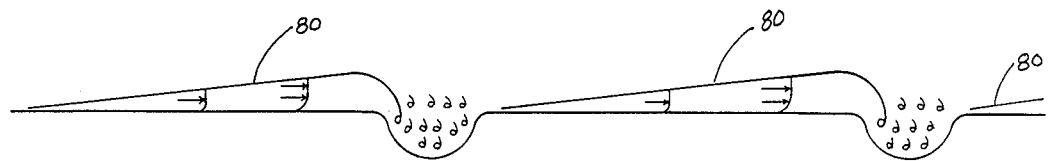
FIG. 29 is a schematic of a boundary layer response theoretically occurring within the evaporative heat exchanger shown in FIG. 19.

This concept of increased convection conductance is depicted by FIG. 29. As air enters either the air conditioning channels or the evaporative cooling channels in a direction shown by the arrows, it immediately begins to develop a boundary layer 80 which is represented by the gradually increasing sloped lines. As the air flows through the channel, the boundary layer 80 grows until it reaches that point in the channel where the surface geometry is interupted i.e. where the recesses begin. At that point, the boundary layer 80 separates from the surface and is dispersed. As the conditioned air passes through the recess, it again begins to develop another boundary layer 80. Having recesses extending perpendicularly to the flow of conditioned air prevents the boundary from growing thick and enhanced heat transfer results. A thick boundary layer acts as a thermal insulator and inhibits heat transfer.

Heat transfer is also enhanced by the formation of the ribs and corresponding recesses in the plates. When the ribs are formed during the stamping process, the materials comprising the plate are stretched. Stretching increases surface area of the plate at the expense of thinning of the materials. FIG. 24 depicts that the thickness T of the composite plate is greater than the thickness T' of the composite plate measured at the rib. For purposes of heat transfer, text book theory and empirical test results indicate that total heat transfer is enhanced proportionately to increased surface area and decreased thickness.

Furthermore, stretching the metal beyond its yield point work-hardens the metal. Thus, although the composite plates are thinner at the ribs compared to the remainder of the composite plate, the ribs actually provide additional rigid support to the composite plate as a result of work-hardening of the metal.

Figure 30:
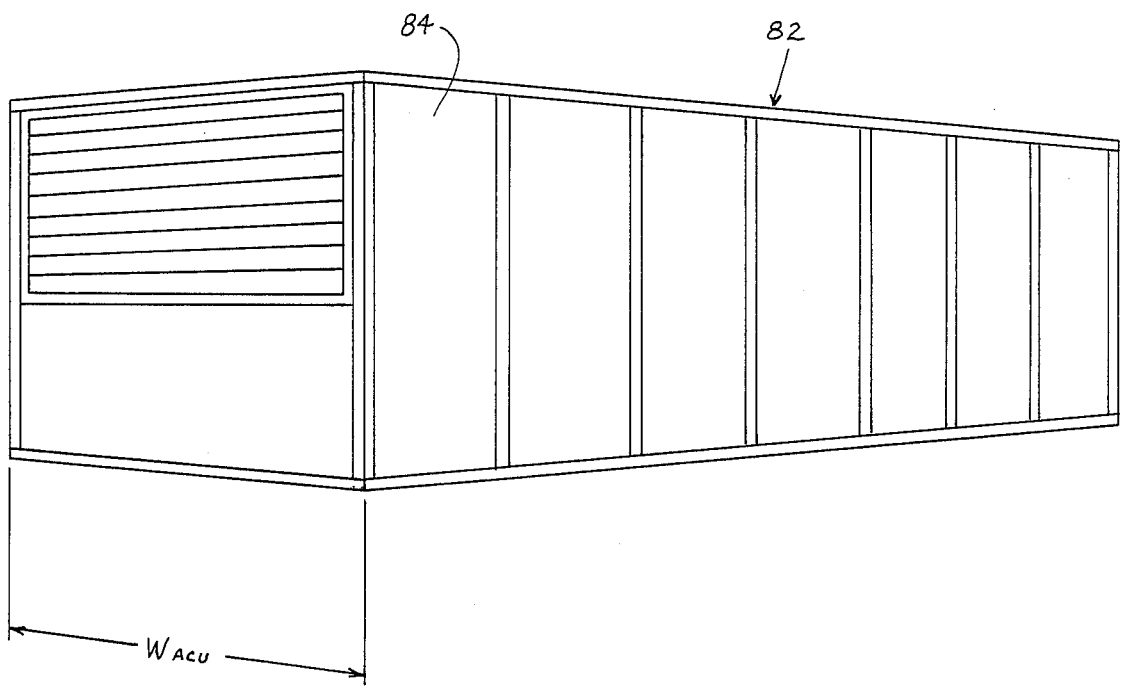
FIG. 30 is a perspective view of a fully-assembled evaporative air conditioning unit incorporating the evaporative heat exchanger shown in FIG. 19.

FIG. 30 depicts a fully-assembled evaporative air conditioning unit 82 having a housing 84. The housing 84 has a width $W_{acu}$. By installing the evaporative heat exchanger (not shown) of the present invention into this evaporative air conditioning unit 82, calculations indicate that the width, $W_{acu}$, of housing 84 is approximately ten feet (10') in order to deliver 25,000 cubic feet of conditioned air per minute at 55° F. Thus, an evaporative air conditioning unit incorporating the heat exchanger of the present invention can be shipped without additional shipping fees and costs for an escort vehicle.

The preferred embodiment of the present invention and its significant advantages and advancements over prior art have been described with a degree of specificity of description. It should be understood, however, that the specificity of description has been made by way of example only and that the scope of the invention falls within the scope of the appended claims.

We claim:

1. A plate for an evaporative heat exchanger, comprising:

a planar sheet of metal extending longitudinally and laterally to define a first and a second metal surface;

a sheet of wicking material extending longitudinally and laterally to define a first and a second wicking material surface whereby said first wicking material surface being superimposed on and attached to said first metal surface to form a composite plate, said composite plate having at least one substantially semicircular protuberance extending longitudinally.

2. A plate for an evaporative heat exchanger as defined in claim 1 wherein:
said protuberance protrudes from said second metal surface and defines a substantially semicircular cavity into the second wicking material surface.

3. A plate for an evaporative heat exchanger as defined in claim 1, wherein:
said protuberance protrudes from said second wicking material surface and defines a substantially semicircular cavity into said second metal surface.

4. A plate for an evaporative heat exchanger as defined in claims 2 or 3, wherein:
said composite plate has two opposite, planar lateral edges.

5. A plate for an evaporative heat exchanger as defined in claim 4, wherein:
said protuberance extends longitudinally between said two lateral edges of said composite plate.

6. A plate for an evaporative heat exchanger as defined in claim 5, wherein:
said protuberance has a thickness less than said composite plate.

7. An evaporative heat exchanger, comprising:
at least a first composite plate and a second composite plate,
each of said composite plates comprising a sheet of metal extending longitudinally and laterally to define a first and a second metal surface and a sheet of wicking material extending longitudinally and laterally to define a first and a second wicking material surface, said first metal surface superimposed on and attached to the first wicking material surface, each of said composite plates having two longitudinal edges and two lateral edges,
said first composite plate having at least one substantially semicircular protuberance protruding from said second metal surface, extending longitudinally and defining a substantially semicircular cavity into the second wicking material surface,
said second composite plate having at least one substantially semi-circular protuberance protruding from said second wicking material surface, extending laterally and defining a substantially semicircular cavity into the second metal surface,
said two longitudinal edges of said first composite plate attached to two said lateral edges of said second composite plate to form a first channel defined by the second wicking material surfaces of said first and second composite plates.

8. An evaporative heat exchanger as defined in claim 7 further comprising:
a third composite plate substantially similar to said first composite plate attached to said longitudinal edges of said second composite plate at said lateral edges to form a second channel defined by the second metal surfaces of said second and third composite plates.

9. An evaporative heat exchanger as defined in claim 7, wherein:
each of said composite plates are substantially square.

10. An evaporative heat exchanger as defined in claim 9, wherein:
said longitudinal edges and said lateral edges extend substantially along each of said composite plates until any longitudinal or lateral edge converges at a point on said composite plate with any lateral or longitudinal edge respectively.

* * * * *